UNITED STATES PATENT OFFICE.

JULIUS ROBERT, OF SEELOWITZ, AUSTRIA.

IMPROVED PROCESS FOR MAKING EXTRACTS.

Specification forming part of Letters Patent No. 59,330, dated October 0, 1866.

*To all whom it may concern:*

Be it known that I, JULIUS ROBERT, of Seelowitz, in the Empire of Austria, have invented a new and Improved Process for Making Extracts; and I do hereby declare that the following is a full, clear, and exact description thereof, which will enable others skilled in the art to make and use the same, reference being had to the accompanying drawing, forming part of this specification.

The drawing represents a diagram whereby the method of carrying out this process can be explained.

This invention relates to a new process for extracting all the juice from plants, particularly from sugar-cane, beet-roots, maize, &c., by means of what I term "diffusion."

Many experiments have been made for extracting or macerating the juice of sugar-cane, &c., by heated liquid instead of by pressure, and indeed the yield of juice obtained by maceration is much greater than that obtained by pressure, for whereas the latter leaves from thirteen to twenty per cent. of juice in the refuse or bagasse, the former reduces the waste of juice to eight per cent.; but it is attended with great inconvenience—viz., that of carrying with the juice a large quantity of particles of the plant—and the quantity of the juice is inferior on account of the high temperature required for the process.

By my new process of diffusion all the disadvantages are obviated, the juice is fully extracted without waste, and it retains all its properties.

Diffusion consists in the following manipulations: First, the plants are cut into pieces of the requisite size; second, the said plants thus prepared are subjected to the effect of this process of diffusion, and after each diffusion to which they have been subjected the diffused juices may be replaced by other juices of less strength than the juice still retained in the cells of said plants, and this manipulation is continued till all the juice or strength of the plants is exhausted; third, the first starting of the process of diffusion must be accelerated by means of a higher temperature of the water, but in such a manner that it may not be injurious to the quality of the juices, (the subsequent diffusions can be effected with cold water;) fourth, the heating of the juices intended to effect the starting of the first diffusion is not done in the extractors, neither by means of closed steam-pipes, nor by direct injection of steam, but always separately in a special vessel called "heating apparatus."

The foregoing constitute the four essential points of my invention, and form consequently the difference between it and the process of warm maceration, which last is intended only for the destruction of the cells of the named plants in order to effect the flowing out of the juices from the torn cells, while my process of diffusion extracts strength or juice out of the closed cells.

I proceed in the following manner: The named plants are cut into strips as equal to each other as possible. The most practicable thickness is from 0.1 to 0.2 of a line, and the width from four to six lines. The size of the strips depends upon the plant which is subjected to the process of diffusion. The proper and equal warming of the strips is effected by filling the extractors with the same and warm liquid simultaneously and in corresponding proportions. The temperature of the said warming-liquid, which may be water or juice, depends upon the temperature and thickness of the strips, and can only be found out by practice. The cold strips and the warming-liquid brought into contact in this manner must not be of a higher degree of temperature than 110° to 120° Fahrenheit immediately after having been put together in the extractor. After the extractors have been filled with the strips, they are then left to themselves for about half an hour, after which time the diffusion is several times repeated with juice of a lower temperature, which operation is continued till all the juices are extracted.

The state of the diffusion which has taken place can be best recognized by comparing the degrees of the liquid drawn off with the juice which the plants originally contained.

The regular and most profitable manipulation in factories consists in working with alternating batteries, such as shown in the diagram. While the diffusion takes place in the extractor last filled of one battery, the preceding extractor of the same battery, which already has given off its thick juice to the manufactory, discharges its thinner juice, which passes through a heater for the purpose of being warmed, and to fill subsequently the corresponding extractor of the other battery. If, for instance, a factory is working with two batteries of six extractors each, (see diagram,) a moment will then come where the extractor No. 5 of battery B is in diffusion, while at the same time No. 5 of battery A discharges its juice to the factory for further treatment. No. 4 of battery B discharges its juice for warming the extractor No. 6 of battery A through heater. No. 6 of battery A is being filled and warmed while No. 6 of battery B is emptied and prepared for new filling. Nos. 1, 2, 3, 4 of battery A are in connection, and, in consequence of the pressure of the water in the reservoir, the juice out of No. 5 of battery A is forced to the factory. Nos. 1, 2, 3 of battery B force by the same pressure of water the contents of No. 4 of battery B through the heater to No. 6 of battery A for the warming of the strips which have been put in No. 6 of battery A. The extractor No. 6 of battery A being filled and in full diffusion, the extractor No. 5 of battery B discharges its juice to the factory. No. 5 of battery A discharges its juice for warming the strips in No. 6 of battery B. No. 6 of battery B is being filled and warmed. No. 1 of battery A is being emptied. Nos. 1, 2, 3, 4 of battery B are forcing the juice from No. 5 of battery B to the factory. Nos. 1, 2, 3 of battery A are forcing it from No. 5 of battery A to the heater, and so on alternately.

According to the specification of the process three principal manipulations have to be observed—namely, filling, diffusing, and discharging of juice to the factory. I execute these three manipulations by two batteries successfully. There may, however, be three batteries constructed for the same purposes, so that each of three manipulations may be executed separately.

By this process I am enabled to extract ten per cent. more juice from beet-root and twenty per cent. more from the sugar-cane than can be done by the old process of pressure; and the juice obtained by my process yields from one-half to one per cent. more raw sugar than that obtained by any other process. Furthermore, the expenses of the extraction are reduced and the apparatus required for the operation is comparatively cheap and not liable to get out of order.

What I claim as new, and desire to secure by Letters Patent, is—

The within-described process of extracting juice from vegetable substances by subjecting them to diffusion, substantially in the manner set forth.

JULIUS ROBERT.

Witnesses:
TH. MILLER,
A. SCHULTZ.